(12) United States Patent
Schmidt et al.

(10) Patent No.: US 6,488,901 B1
(45) Date of Patent: Dec. 3, 2002

(54) METHOD OF ADJUSTING A CIRCULATING FLUIDIZED BED AND USE OF THE METHOD

(75) Inventors: Hans-Werner Schmidt, Frankfurt am Main (DE); Martin Rahn, Frankfurt am Main (DE); Horst Heisswolf, Frankfurt am Main (DE); Marc Schnell, Meinborn (DE); Bernd Erkes, Brüggen (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/423,146

(22) PCT Filed: May 6, 1998

(86) PCT No.: PCT/EP98/02668
§ 371 (c)(1),
(2), (4) Date: Jun. 8, 2000

(87) PCT Pub. No.: WO98/50142
PCT Pub. Date: Nov. 12, 1998

(30) Foreign Application Priority Data

May 7, 1997 (DE) .......................................... 197 19 481

(51) Int. Cl.⁷ .............................. B01J 8/18; C01G 49/00
(52) U.S. Cl. ................................ 423/148; 423/DIG. 16; 423/632; 423/633; 422/139; 422/147
(58) Field of Search .......................... 423/74, 148, 632, 423/633, 634, DIG. 16; 422/139, 147

(56) References Cited

U.S. PATENT DOCUMENTS

| 4,042,376 A | 8/1977 | Collin Per Harald |
| 4,144,316 A | 3/1979 | Haack et al. |
| 4,334,898 A | 6/1982 | Zhuber-Okrog et al. |
| 4,931,260 A | * 6/1990 | Molerus et al. ............. 422/147 |

FOREIGN PATENT DOCUMENTS

| EP | 0 501 542 | 9/1992 |
| EP | 0 543 757 | 5/1993 |
| EP | 549252 | * 6/1993 |
| EP | 0 685 449 | 12/1995 |
| FR | 2137441 | * 12/1971 |

\* cited by examiner

*Primary Examiner*—Steven Bos
(74) *Attorney, Agent, or Firm*—Norris McLaughlin & Marcus

(57) ABSTRACT

A process for adjusting a circulating fluidized bed, wherein a part of the carrier gas is recovered, mixed with a propellant and returned to the fluidized bed as a carrier gas.

4 Claims, 2 Drawing Sheets

METHOD OF ADJUSTING A CIRCULATING FLUIDIZED BED AND USE OF THE METHOD

This invention relates to a method of adjusting a circulating fluidized bed and to the use of the method.

Methods of adjusting a circulating fluidized bed are known. In E. Henglein, Lexikon Chemische Technik, VCH Verlagsgesellschaft, 1988, pages 676 to 678, fluidized-bed processes are described, including the mode of function of a circulating fluidized bed. It is emphasized that the carrier gas is supplied to the reactor from the bottom. From E. Henglein, Lexikon Chemische Technik, VCH Verlagsgesellschaft, 1988, page 267, it is known that continuously mixing two gases can advantageously be effected by means of an injector mixer.

The DE-OS 39 08 972 describes an apparatus for producing pulverized silicon nitride. The production is effected in a fluidized bed, where nitrogen is used as carrier gas for forming the fluidized bed.

There is furthermore known the procedure, where as carrier gas there is used at least one partial stream of the pure gas discharged from the cyclone of the circulating fluidized bed. In general, the pure gas is discharged from the cyclone by means of a rotary-piston blower and again supplied to the reactor from the bottom. In general, the gases produced in the reactor contain a major amount of acid components, chiefly HCl and $SO_2$. At the process temperatures, however, these acid components relatively quickly lead to a corrosive damage of the plant components, in particular of the rotary-piston blower used. In addition, the pure gases must be cooled to below the dew point, before they are passed through the rotary-piston blower. The spray of the gases at dew point contains major amounts of salts at the saturation limit, which during the compaction in the rotary-piston blower are precipitated, adhere to and block the rotary-piston blower after a relatively short operating period.

It is therefore the object underlying the invention to create a method of adjusting a circulating fluidized bed, where corrosive damages of the plant components and damages due to the precipitation of salts are largely avoided.

The object underlying the invention is solved by a method of adjusting a circulating fluidized bed, where as partial amount of the carrier gas there is used at least one partial stream of the pure gas discharged from the cyclone on at least one point of the circulating fluidized bed, and prior to its introduction into the circulating fluidized bed the pure gas used as partial amount of the carrier gas is mixed in an injector mixer with 10 to 90 wt-% propellant, based on the amount of the partial stream of the pure gas discharged from the cyclone, and the mixture is supplied as carrier gas to the circulating fluidized bed. The propellant used includes for instance $N_2$, air or steam.

The term "circulating fluidized bed" refers to a fluidized bed with strong movement of solids, high expansion, internal back-mixing, and a high concentration of solids at the reactor outlet with a partial recirculation of the solid. It substantially consists of a vertically arranged reactor, a subsequently provided cyclone and of a return line for recirculating solids discharged from the cyclone into the reactor.

The term "injector mixer" refers to the generally known injectors. In these injectors, the one partner of the mixture is centrally introduced at high speed into a mixing line, while the second gas stream enters the line via a remaining annular gap. Due to the high flow rates and the difference in velocity at the point of entrance, there is a great turbulence in the mixing line, so that a continuous mixing of the two gases can occur.

The supply of the mixture is effected on at least one point of the circulating fluidized bed. The mixture can for instance be supplied to the reactor of the circulating fluidized bed from the bottom. It is, however, also possible to supply the mixture at a point of the return line for the solids between cyclone and reactor.

It was advantageously found out that by means of the inventive mixing of the pure gas with the nitrogen corrosive damages in the plant components and damages due to a precipitation of salts can largely be avoided. A further advantage consists in that the provision of a rotary-piston blower can completely be omitted. The pure gas used as carrier gas can be passed through the injector mixer without previous cooling and again be supplied to the reactor, so that as compared to the use of a rotary-piston blower the cooling system for the pure gas, the cooling energy and heating costs are saved. The preliminary pressure of the propellant, which generally is about 2 to 50 bar, preferably 3 to 25 bar, and the pressure in the reactor, are advantageously sufficient for transporting the partial amount of the pure gas to be used as carrier gas via the injector mixer to the reactor.

A preferred aspect of the invention consists in that the solids to be discharged from the cyclone are at least partly passed through a U-shaped return line and are again supplied to the reactor, and the mixture is at least partly introduced into the lower portion of the U-shaped return line. The U-shaped return line may constructively be designed as siphon. The introduction of at least a partial amount of the mixture into the lower portion of the U-shaped return line leads to the advantageous formation of a further fluidized bed in the lower portion of the U-shaped return line. With this procedure it is possible to use other gases, for instance nitrogen, as carrier gas for the formation of the fluidized bed in the reactor. It is, however, very well possible to introduce part of the mixture into the lower portion of the U-shaped return line, and to supply the second part of the mixture to the reactor from the bottom as carrier gas. When the mixture is at least partly introduced into the lower portion of the U-shaped return line, it is advantageously possible to prevent corrosive damages in the plant components and damages due to a precipitation of salts, where here as well the provision of a rotary-piston blower can be omitted. A further advantage of this procedure consists in that by introducing at least a partial amount of the mixture into the lower portion of the U-shaped return line a pressure compensation between the reactor and the cyclone can be realized relatively easily. At the same time, the transport of the solids between the cyclone and the reactor in the return line is advantageously facilitated.

In accordance with a further aspect of the invention it is provided that 3 to 10% of the mixture are introduced into the lower portion of the U-shaped return line. The remaining part of the mixture is advantageously supplied to the reactor from the bottom as carrier gas. In this way, the respective formation of the fluidized bed in the reactor or in the return line is optimized, where at the same time damages and damages due to salt deposits in the plant components can be avoided.

Subject-matter of the invention finally is the use of the method for producing $Fe_2O_3$ or $Fe_3O_4$. It is generally known to produce $Fe_2O_3$ (red pigment) or $Fe_3O_4$ (black pigment) in the circulating fluidized bed. The production of $Fe_2O_3$ is effected in an oxidizing atmosphere. The production of $Fe_3O_4$ is effected in a neutral or weakly reducing atmosphere. However, the raw pigments used have a relatively large content of chlorine and sulfur, which in the reactor of the circulating fluidized bed is converted into HCl and $SO_2$.

When a partial stream of the pure gas discharged from the cyclone is used as carrier gas for the formation of the fluidized bed, the pure gas containing HCl and $SO_2$ leads to corrosive damages of the plant components. Due to this fact, the use of a rotary-piston blower, for instance for transporting the pure gas from the cyclone again into the reactor, is only briefly possible, as the rotary-piston blower is no longer operable even after relatively short operating periods due to salt deposits and the corrosive damages caused by the acid components and the relatively high process temperatures. The corrosive gas allows an operation of the rotary-piston blower only with an extremely high effort (cooling, scrubbing of noxious gas, condensation and spray removal of the pure gas prior to entrance into the rotary-piston blower, use of expensive materials). The production of $Fe_2O_3$ or $Fe_3O_4$ can, however, advantageously be realized by using the method.

The invention will subsequently be explained in detail and by way of example with reference to the drawing (FIG. 1, FIG. 2).

Figure 1:
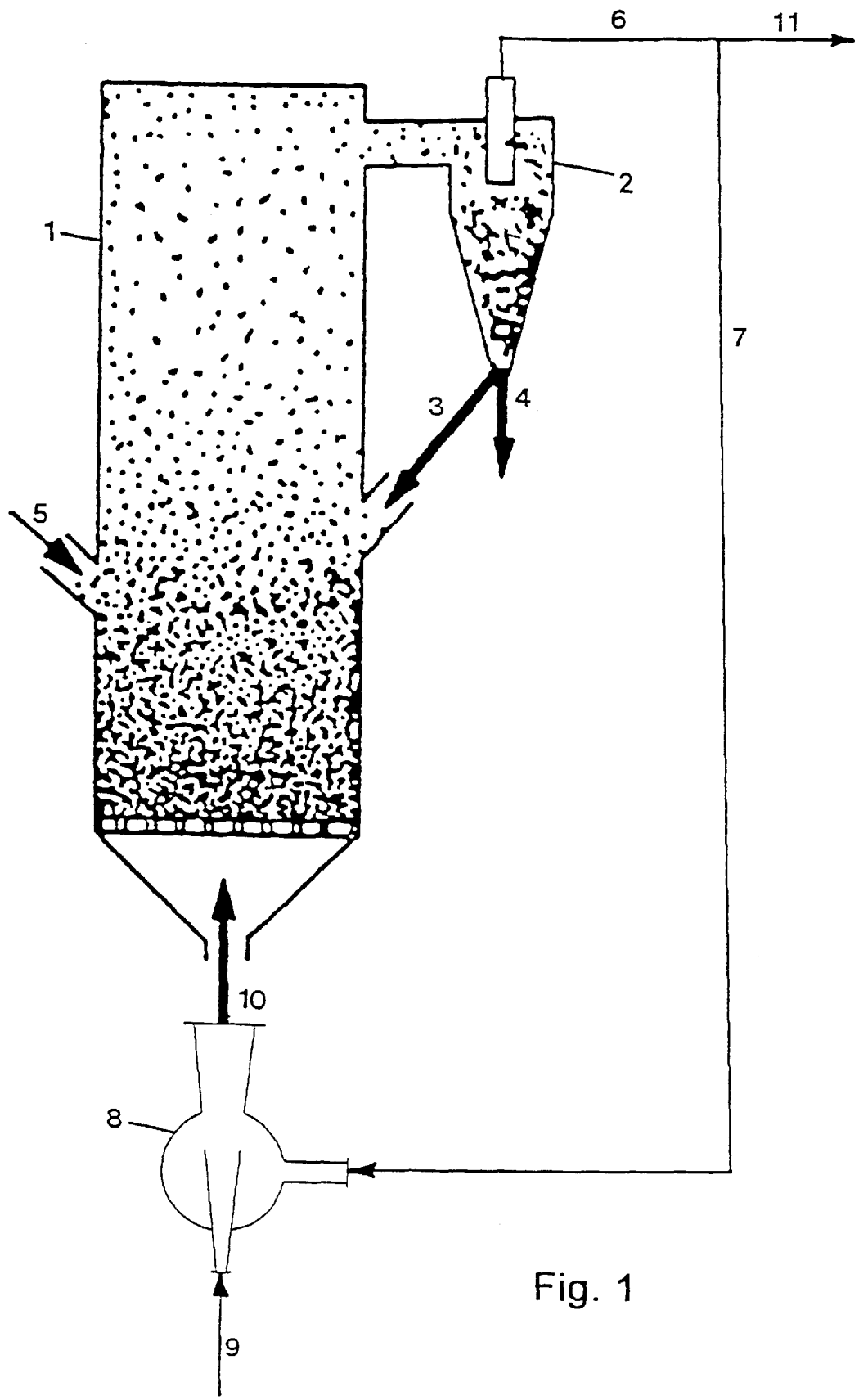
FIG. 1 shows a schematic, simplified flow diagram of the method of adjusting a circulating fluidized bed.

FIG. 1 represents the method of adjusting a circulating fluidized bed in the form of a flow diagram. Behind the vertically arranged reactor 1 a cyclone 2 is provided, which is furthermore connected with the reactor 1 via the return line 3. In the cyclone 2, the entrained solids are separated and in part discharged from the system via line 4. Such circulating fluidized bed is advantageously suited for producing $Fe_2O_3$ or $Fe_3O_4$, where the raw pigment, which generally contains amounts of chlorine and sulfur, is introduced into the system via line 5. The pure gas removed from the cyclone 2 is discharged via line 6 and is likewise removed from the system in part via line 11. A partial stream of the pure gas is, however, supplied to the injector mixer 8 via line 7. To the injector mixer 8 nitrogen is furthermore supplied as propellant via line 9, which propellant should generally be provided with a preliminary pressure of about 2 to 50 bar. In the injector mixer 8 the partial amount of the pure gas used as carrier gas is mixed with the nitrogen. The mixture is subsequently supplied as carrier gas from the bottom to the reactor 1 via line 10.

Figure 2:
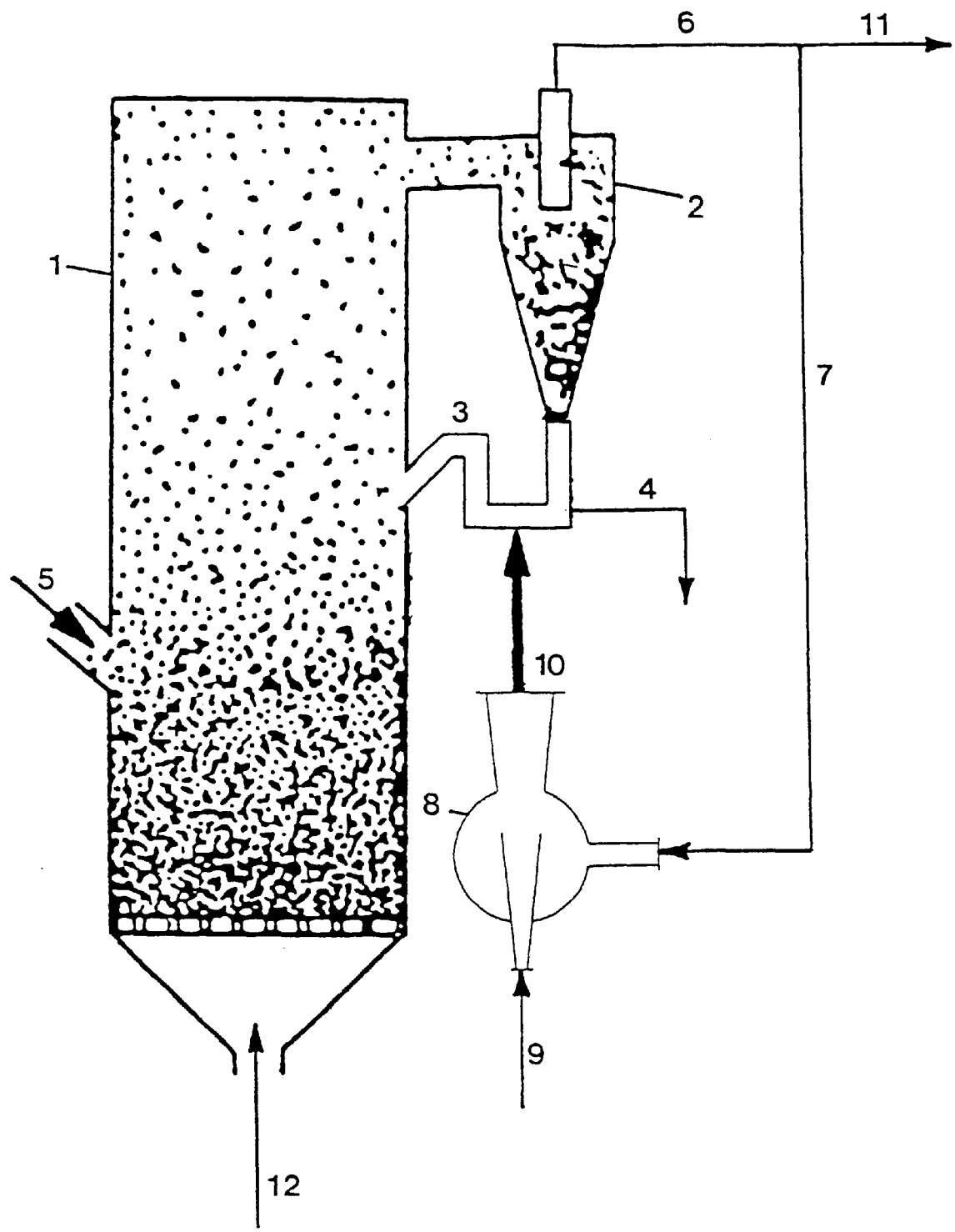
FIG. 2 shows a schematic, simplified flow diagram of a variant of the method of adjusting a circulating fluidized bed.

FIG. 2 shows a variant of the method of adjusting a circulating fluidized bed in the form of a schematic, simplified flow diagram. In contrast to the procedure represented in FIG. 1 it is provided to give the return line 3 between the cylone 2 and the reactor 1 a U-shaped design. The mixture withdrawn from the injector mixer 8 is introduced via line 10 into the lower portion of the U-shaped return line 3. In the lower portion of the U-shaped return line 3 a further fluidized bed is formed, where the transport of the solids between the cyclone 2 and the reactor 1 in the return line 3 is advantageously facilitated. For forming the fluidized bed in the reactor 1 in accordance with this procedure, another carrier gas, for instance pure nitrogen, is introduced via line 12 from the bottom into the vertical reactor 1.

It is of course also possible to combine the procedures represented in FIGS. 1 and 2, so that part of the mixture is introduced into the reactor 1 from the bottom, and another part of the mixture is introduced into the lower portion of the U-shaped return line 3.

What is claimed is:

1. A method of adjusting a circulating fluidized bed, which circulates into a cyclone separator which separates said fluidized bed into a pure gas stream and a solids stream, wherein a partial amount of said pure gas stream is mixed in an injector mixer with 10 to 90% wt. of a propellant, based on said partial amount of said pure gas stream, and is supplied to said fluidized bed as a carrier gas.

2. The method as claimed in claim 1, wherein at least part of the solids stream is passed through a U-shaped return line and returned to the fluidized bed, and at least a part of said mixture is introduced into the lower part of the U-shaped return line.

3. The method as claimed in claim 2, wherein said at least part of said mixture is an amount of from 3 to 10% of the mixture.

4. A method for the production of $Fe_2O_3$ or $Fe_3O_4$ in a circulating fluidized bed which comprises adjusting the fluidized bed by the method of claim 1.

\* \* \* \* \*